Oct. 10, 1961    H. A. SEIDMAN    3,004,174
FOUR PHASE CLOCK

Filed May 15, 1959    2 Sheets-Sheet 1

*INVENTOR.*
HERBERT A. SEIDMAN

BY *H. L. Mackey*

ATTORNEY.

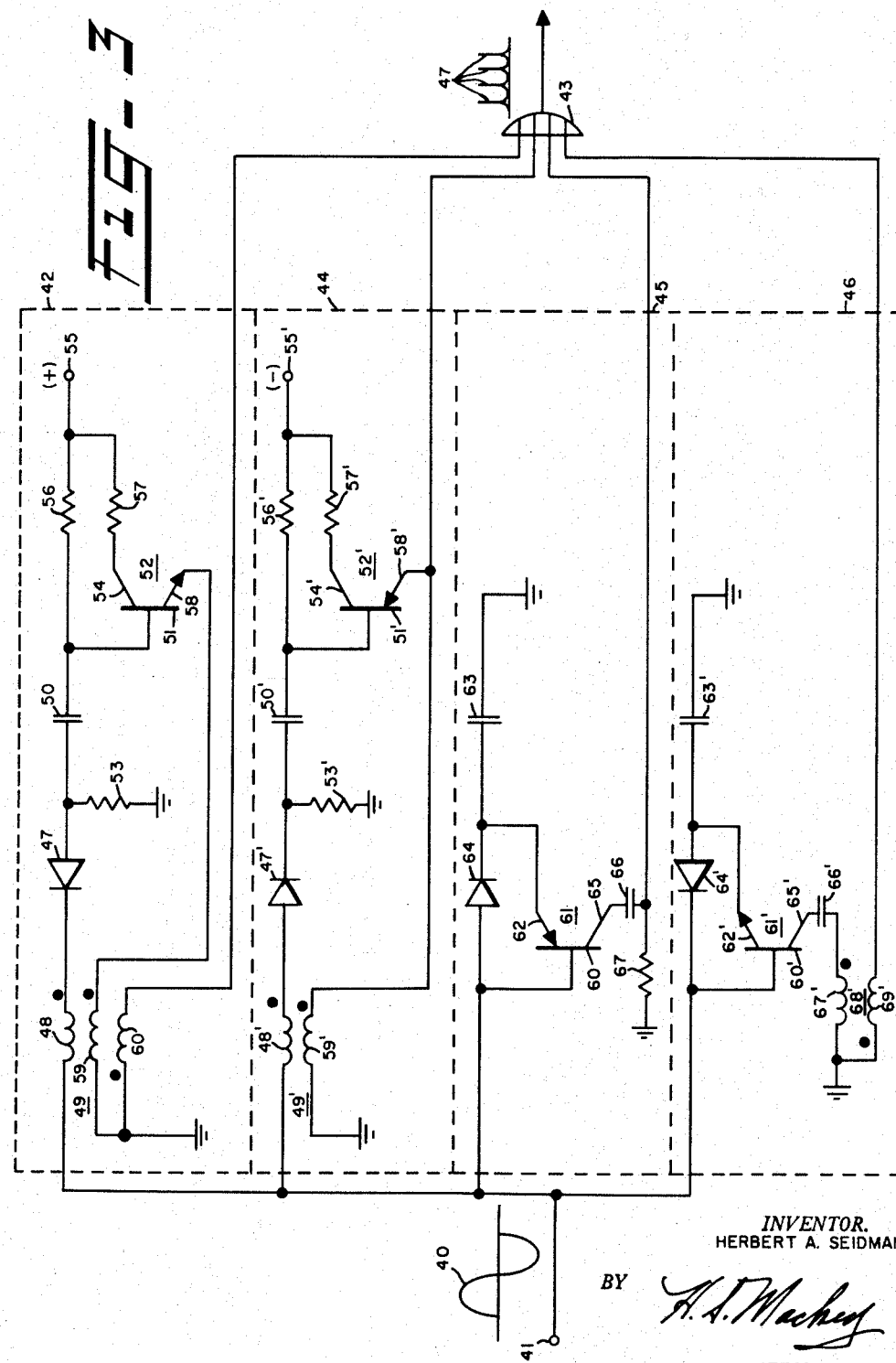

United States Patent Office 3,004,174
Patented Oct. 10, 1961

3,004,174
FOUR PHASE CLOCK
Herbert Alvin Seidman, Bronx, N.Y., assignor to General Precision Inc., a corporation of Delaware
Filed May 15, 1959, Ser. No. 813,511
20 Claims. (Cl. 307—88.5)

This invention relates to an electronic circuit which provides a four phase clock output and more particularly to a circuit which provides output signals corresponding in time, with the peaks and zero voltage levels of a varying voltage.

Four phase clock signal generators heretofore have either lacked the accuracy necessary in high speed computers or have utilized cumbersome and expensive electronic equipment, subject to frequent breakdowns, to achieve the necessary accuracy. The prior devices utilize either frequency multiplication and division or delay devices, and in all instances a passive or active network is required to change a reference voltage from one state to another to obtain the four phase clock output required.

One object of this invention is to provide a novel four phase clock circuit in which the clock output is derived from direct measurements of a reference voltage.

Another object of the invention is to provide a four phase clock circuit in which the output is derived without mutating the reference voltage from which the clock signal is obtained.

Another object of the invention is to provide a four phase clock circuit which is compact, low in weight, easily manufactured, and reliable in operation.

A further object of this invention is to provide a novel circuit for detecting voltage peaks of a varying voltage.

Yet another object is to provide a peak detecting circuit which is reliable and is easily manufactured.

This invention contemplates a novel circuit for providing outputs indicative of the occurrence of voltage peaks and zero voltages of a varying reference voltage comprising, first means responsive to the zero voltage conditions of the reference voltage for supplying outputs corresponding in time to the occurrence of the zero voltage conditions, second novel means responsive to the peak voltage conditions of the reference voltage for supplying outputs corresponding in time to the occurrence of the peak voltage conditions, and means for combining the outputs of the said first and second means.

The foregoing and other objects and advantages of the invention will appear more clearly from a consideration of the specification and drawings wherein several embodiments of the invention are described and shown in detail for illustration purposes only.

In the drawings:

FIGURE 3 is a schematic circuit diagram of a novel four phase clock circuit constructed according to the invention; and, FIGURE 4 is another embodiment of the novel clock circuit shown in FIG. 3.

Figure 1:
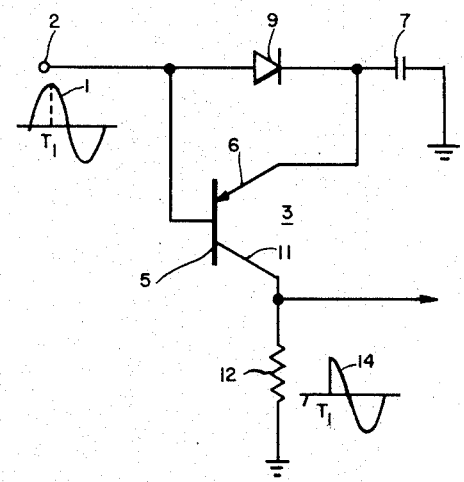
FIGURE 1 is a schematic circuit diagram of a novel peak detecting circuit constructed in accordance with the invention.

In FIG. 1, an alternating electric reference voltage shown graphically at 1 is applied to an input terminal 2 of the peak detector. A PNP transistor 3 has its base 5 connected to input terminal 2 and its emitter 6 to one side of a grounded condenser 7. A diode 9 has its anode connected to base 5 and its cathode connected to emitter 6. The collector 11 of transistor 3 is connected to ground by a resistor 12. An output voltage shown graphically at 14 appears at the collector when a reference voltage as shown at 1 is applied to the circuit input 2.

In operation the input signal applied at terminal 2 during the first half of its positive swing charges capacitor 7 through diode 9. Transistor 3 is cut off since the voltage drop across diode 9 prevents conduction through the transistor and no output appears at the collector 12. When the input voltage reaches its peak at time $T_1$ and starts to fall the charge on condenser 7 is sufficient to bias the transistor 3 into conduction and the charge on condenser 7 is discharged through the transistor to provide the sharp voltage rise which is indicated at time $T_1$ in the output voltage graph 14. Thereafter, for the remainder of the cycle, the output follows the input.

Figure 2:
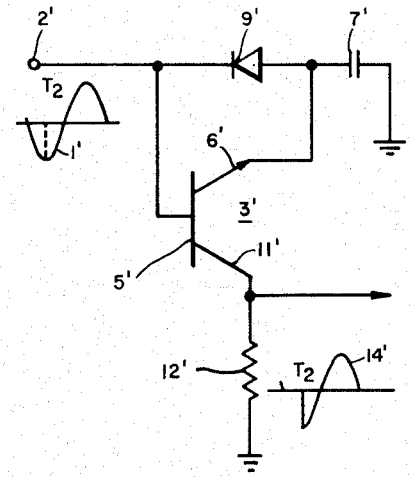
FIGURE 2 is another embodiment of the novel peak detector shown in FIG. 1.

The embodiment shown in FIG. 1 will detect positive peaks only and will not track the negative peaks of the input. The embodiment of FIG. 2, however, will provide a sharp voltage rise at negative peaks of the input voltage. The circuit of FIG. 2 is identical with that of FIG. 1 except for the transistor 3' and the connection of diode 9'. Transistor 3' is an NPN type and diode 9' has its cathode connected to the base 5' and its anode to the emitter 6'. Thus, condenser 7' charges on the first half of the negative swing of the input voltage and discharges through transistor 3' when the negative peak is reached to provide a sharp negative voltage rise which is indicated at time $T_2$ in the output voltage graph 14'.

In FIG. 3 an alternating electric voltage shown graphically at 40 is applied to an input terminal 41 of the four phase clock circuit. A multiar circuit 42 which is arranged to detect zero voltage levels of a negative going voltage has its input connected to terminal 41 and its output to an "or" circuit 43. Another multiar circuit 44 which is arranged to detect zero voltage levels of a positive going voltage has its input connected to terminal 41 and its output connected to "or" circuit 43. The multiars provide pulse outputs which are combined in the "or" circuit.

A positive peak detector 45 and a negative peak detector 46 each have their inputs connected to terminal 41 and their outputs connected to "or" circuit 43. Both detectors are arranged to provide pulse outputs which are combined with the pulse outputs from the multiar circuits resulting in the output wave shown graphically at 47.

Multiar 42 is a transistorized multiar similar in operation to the vacuum tube multiar disclosed by Millman and Taub in sec. 15–7 of Pulse and Digital Circuits, McGraw-Hill, 1956; and multiar 44 is similar thereto but arranged to respond to zero voltage levels of a positive going voltage.

The input signal from terminal 41 is applied to the cathode of a diode 47 through a winding 48 of a transformer 49. A condenser 50 is connected between the anode of diode 47 and the base 51 of an NPN transistor 52. A resistor 53 is connected between the anode of diode 47 and ground. The base 51 and the collector 54 of transistor 52 are connected to a source of positive voltage 55 by resistors 56 and 57, respectively. The emitter 58 of transistor 52 is connected to ground through another winding 59 of transformer 49. The output at emitter 58 is a negative pulse, therefore, a third winding 60 of transformer 49 connected between ground and "or" circuit 43 is utilized to invert the output. The proper directions of the windings of transformer 49 are indicated by the polarity dots.

In operation, transistor 52 of multiar 42 acts as an amplifier with a gain of less than unity. The output at emitter 58 is fed back to the input regeneratively through windings 59 and 48 of transformer 49. But diode 47 prevents feed back as long as the potential of the input at terminal 41 exceeds the potential at the anode of diode 47. As the potential at terminal 41 approaches zero diode 47 is biased into conduction; regenerative feed back takes place; and transistor 52 oscillates. The values of resistor 53 and condenser 50 are selected so that only one oscillation takes place before transistor 52 is shut off by the increasing negative potential at input terminal 41.

The input signal from terminal 41 is applied to the cathode of a diode 47' through a winding 48' of a transformer 49'. A condenser 50' is connected between the anode of diode 47' and the base 51' of a PNP transistor 52'. A resistor 53' is connected between the anode of diode 47' and ground. The base 51' and the collector 54' of transistor 52' are connected to a source of negative voltage 55' by resistors 56' and 57', respectively. The emitter 58' of transistor 52' is connected to ground through another winding 59' of transformer 49' and to "or" circuit 43. The output at emitter 58' is a positive pulse occuring at the zero voltage level of the positive going voltage.

The input signal from terminal 41 is applied to the base 60 of a PNP transistor 61 and the emitter 62 of transistor 61 is connected to one side of a grounded condenser 63. A diode 64 has its anode connected to base 60 and its cathode connected to emitter 62. The collector 65 of transistor 61 is connected to ground by a capacitor 66 connected in series with a resistor 67 to differentiate the output from collector 65. The differentiated output is applied to "or" circuit 43 and comprises a sharp positive peak occurring at the positive peaks of the input voltage.

The input signal from terminal 41 is also applied to the base 60' of an NPN transistor 61' and the emitter 62' of transistor 61' is connected to one side of a grounded condenser 63'. A diode 64' has its cathode connected to base 60' and its anode connected to emitter 62'. The collector 65' of transistor 61' is connected to ground by a capacitor 66' connected in series with a primary winding 67' of a transformer 68'. The secondary winding 69' of transformer 68' has one side grounded and the other connected to "or" circuit 43. Since the differentiated output is negative transformer 68' is utilized to invert the output which is applied to "or" circuit 43.

Peak detectors 45 and 46 operate in the same manner as do the detectors shown in FIGS. 1 and 2, respectively. Detector 45 differs from the detector shown in FIG. 1 by the addition of condenser 66 which is added to provide the differentiated output. Detector 46 differs from the detector shown in FIG. 1 by the addition of a condenser 66' which is added to provide the differentiated output, and the substitution of transformer 68' for the resistor 12' used in FIG. 2 for inverting the circuit output. If all negative pulses were desired at the output of "or" circuit 43 the outputs of multiar 44 and peak detector 45 would be inverted and those of multiar 42 and detector 46 would be left in their normal state.

Figure 4:
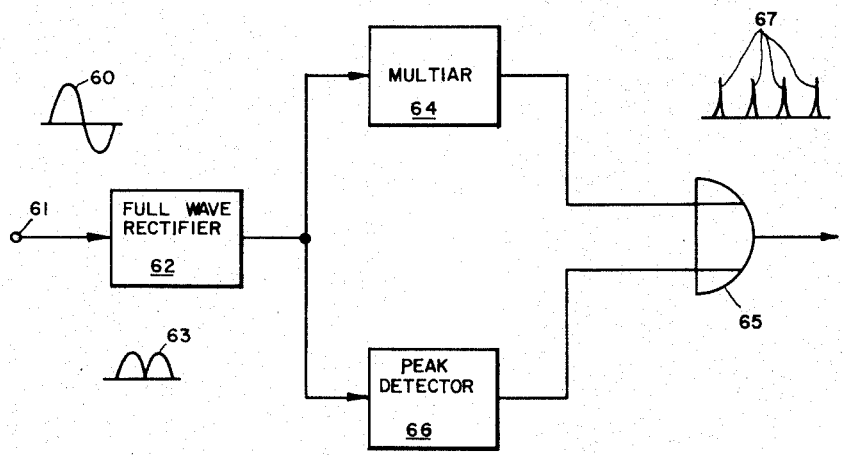

In the embodiment of FIG. 4 an alternating electric voltage shown graphically at 60 is applied to an input terminal 61 of the four phase clock circuit. A full wave rectifier 62 connected to terminal 61 provides a fluctuating direct voltage output shown graphically at 63. The output from rectifier 62 is applied to a multiar circuit 64, which may be similar to either multiar circuits 42 or 44 of FIG. 3, and the output of multiar 64 is applied to an "or" gate 65. The output from rectifier 62 is also applied to a peak detector circuit 66 which is similar to either peak detectors 45 or 46 of FIG. 3 depending on the polarity of the output from rectifier 62. That is, if the pulsating output is positive a positive peak detector such as 45 would be used, but if it is negative, a negative peak detector such as 46 would be used. The output from peak detector 66 is applied to "or" gate 65. With this arrangement multiar 64 provides pulsed outputs at the zero voltage levels and peak detector 66 provides pulsed outputs at both negative and positive peaks of the input voltage at terminal 61. The "or" circuit 65 combines the outputs from multiar 64 and peak detector 66 as shown at 67.

In each of the embodiments a sine wave input was shown in order to simplify the explanation but other wave forms will operate as well and provide the same result.

While several embodiments of the invention have been shown and described in detail it is to be expressly understood that the invention is not to be limited thereto.

What is claimed is:

1. A peak detecting circuit comprising; a PNP transistor having a base, an emitter, and a collector; means for applying a source of varying voltage to the base; a diode having its anode connected to the base and its cathode connected to the emitter; a condenser connected to the emitter; and means connected between the condenser and the collector for providing a sharp voltage change which corresponds in time to the positive voltage peaks of said varying voltage.

2. A peak detecting circuit comprising; an NPN transistor having a base, an emitter and a collector; means for applying a source of varying voltage to the base; a diode having its cathode connected to the base and its anode connected to the emitter; a condenser connected to the emitter; and means connected between the condenser and the collector for providing a sharp voltage change which corresponds in time to the negative voltage peaks of said varying voltage.

3. A peak detecting circuit comprising; a PNP transistor having a base, an emitter, and a collector; means for applying a source of varying voltage to the base; a diode having its anode connected to the base and its cathode connected to the emitter; a storage condenser connected to the emitter; and a condenser and resistor connected in series between the storage condenser and the collector for providing a pulse output which corresponds in time to the positive voltage peaks of said varying voltage at the common junction of the series connected condenser and resistor.

4. A peak detecting circuit comprising; an NPN transistor having a base, an emitter, and a collector; means for applying a source of alternating voltage to the base; a diode having its cathode connected to the base and its anode connected to the emitter; a storage condenser connected to the emitter; and a condenser and resistor connected in series between the storage condenser and the collector for providing a pulse output which corresponds in time to the negative voltage peaks of said varying voltage at the common junction of the series connected condenser and resistor.

5. A circuit for providing outputs indicative of the occurrence of voltage peaks and zero voltages of a varying reference voltage comprising, first means responsive to the zero voltage conditions of the reference voltage for supplying outputs corresponding in time to the occurrence of said zero voltage conditions, second means responsive to the peak voltage conditions of the reference voltage for supplying outputs corresponding in time to the occurrence of said peak voltage conditions, and means for combining the outputs of said first and second means.

6. A circuit for providing pulse outputs corresponding in time to the occurrence of voltage peaks and zero voltages of a periodically varying reference voltage comprising, multiar means for detecting the zero voltage conditions of the reference voltage and for supplying outputs corresponding in time to the occurrence of said zero voltage conditions, peak detecting means for detecting the peak voltage conditions of the reference voltage and for supplying outputs corresponding in time to the occurrence of said peak voltage conditions, and means for combining the outputs of said multiar and peak detecting means.

7. A circuit for supplying a four phase clock output comprising, a first multiar circuit for detecting the zero voltage level of a negative going voltage, a second multiar circuit for detecting the zero voltage level of a positive going voltage, a first peak detecting circuit for detecting positive voltage peaks, a second peak detecting circuit for detecting negative voltage peaks, means for connecting said multiar and peak detecting circuits in parallel to a source of alternating voltage, and means for combining the outputs of said multiar and peak detecting circuits.

8. A four phase clock circuit for providing pulse outputs corresponding in time to the occurrence of voltage peaks and zero voltages of an alternating reference voltage comprising, a first multiar circuit for detecting the zero voltage level of a negative going voltage and for providing a pulse output corresponding in time therewith, a second multiar circuit for detecting the zero voltage level of a positive going voltage and for providing a pulse output corresponding in time therewith, a first peak detecting circuit for detecting positive voltage peaks and for providing a pulse output corresponding in time therewith, a second peak detecting circuit for detecting negative voltage peaks and for providing a pulse output corresponding in time therewith, means for connecting said multiar and peak detecting circuits in parallel to said alternating reference, and means for combining the pulse outputs of said multiar and peak detecting circuits.

9. A four phase clock circuit as set forth in claim 8 in which said first and second peak detecting circuits each include; a transistor having a base which serves as an input, an emitter, and a collector; asymmetric conducting means connected between the base and the emitter; electric storage means connected to the emitter, and means connected between the storage means and the collector for providing the output.

10. A four phase clock circuit as set forth in claim 8 in which said first peak detecting circuit includes; a PNP transistor having a base which serves as an input, an emitter, and a collector; a diode having its anode connected to the base and its cathode connected to the emitter; a condenser connected to the emitter; and means connected between the condenser and the collector for providing the output; and said second peak detecting circuit includes; an NPN transistor having a base which serves as an input, an emitter, and a collector; a diode having its cathode connected to the base and its anode connected to the emitter; a condenser connected to the emitter; and means connected between the condenser and the collector for providing the output.

11. A circuit for supplying a four phase clock output comprising, a multiar circuit for detecting zero voltage levels, a peak detecting circuit for detecting predetermined voltage peaks, a full wave rectifier for connecting said multiar and peak detecting circuits in parallel to an alternating reference voltage, and means for combining the outputs from said multiar and peak detecting circuits.

12. A four phase clock circuit for providing pulse outputs corresponding in time to the occurrence of voltage peaks and zero voltage levels of an alternating reference voltage comprising, a multiar circuit for detecting zero voltage levels and for providing a pulse output corresponding in time therewith, a peak detecting circuit for detecting predetermined voltage peaks and for providing a pulse output corresponding in time therewith, a full wave rectifier for connecting said multiar and peak detecting circuit to the alternating reference volage, and means for combining the pulse outputs of said multiar and peak detecting circuits.

13. A four phase clock circuit as set forth in claim 12 wherein said full wave rectifier provides a positive pulsating direct current, and said peak detecting circuit is responsive to positive peaks.

14. A four phase clock circuit as set forth in claim 13 wherein said peak detecting circuit includes; a PNP transistor having a base which serves as an input, an emitter, and a collector; a diode having its anode connected to the base and its cathode connected to the emitter; a condenser connected to the emitter; and means connected between the condenser and the collector for providing the output.

15. A four phase clock circuit as set forth in claim 12 wherein said full wave rectifier provides a negative pulsating direct current, and said peak detecting circuit is responsive to negative peaks.

16. A four phase clock circuit as set forth in claim 15 wherein said peak detecting circuit includes; an NPN transistor having a base which serves as an input, an emitter, and a collector; a diode having its cathode connected to the base and its anode connected to the emitter; a condenser connected to the emitter; and means connected between the condenser and the collector for providing the output.

17. A peak detecting circuit comprising; a PNP transistor having a base, an emitter, and a collector, means for applying a source of varying voltage to the base; an asymmetric conductor connecting the base and the emitter, said conductor being connected to present a low impedance to positive voltages applied to said base; electric storage means connected to the emitter; and means connected between said storage means and said collector for providing a sharp voltage change which corresponds in time to the positive voltage peaks of said varying voltage.

18. A peak detecting circuit as set forth in claim 17 in which said asymmetric conducting means is a diode having its anode connected to the base and its cathode connected to the emitter.

19. A peak detecting circuit comprising; an NPN transistor having a collector, means for applying a source of varying voltage to the base; an asymmetric conductor connecting the base and the emitter, said conductor being connected to present a low impedance to negative voltages applied to said base; electric storage means connected to the emitter; and means connected between said storage means and said collector for providing a sharp voltage change which corresponds in time to the negative voltage peaks of said varying voltage.

20. A peak detecting circuit as set forth in claim 19 in which said asymmetric conducting means is a diode having its cathode connected to the base and its anode connected to the emmitter.

References Cited in the file of this patent

UNITED STATES PATENTS

| | | |
|---|---|---|
| 2,644,895 | Lo | July 7, 1953 |
| 2,657,318 | Rack | Oct. 27, 1953 |
| 2,866,106 | Schuh | Dec. 23, 1958 |
| 2,913,600 | Cunningham et al. | Nov. 17, 1959 |

Notice of Adverse Decision in Interference

In Interference No. 93,332 involving Patent No. 3,004,174, H. A. Seidman, Four phase clock, final judgment adverse to the patentee was rendered July 15, 1963, as to claims 2, 19 and 20.

[*Official Gazette December 22, 1964.*]

Notice of Adverse Decision in Interference

In Interference No. 93,331 involving Patent No. 3,004,174, H. A. Seidman, FOUR PHASE CLOCK, final judgment adverse to the patentee was rendered July 15, 1963, as to claim 17.

[*Official Gazette May 18, 1965.*]